(12) United States Patent
Miyatake et al.

(10) Patent No.: US 10,347,447 B2
(45) Date of Patent: Jul. 9, 2019

(54) TANK TYPE VACUUM CIRCUIT BREAKER

(71) Applicant: Mitsubishi Electric Corporation, Chiyoda-ku, Tokyo (JP)

(72) Inventors: Hideki Miyatake, Tokyo (JP); Masahiro Arioka, Tokyo (JP); Tadahiro Yoshida, Tokyo (JP); Toshihiro Matsunaga, Tokyo (JP); Toru Kimura, Tokyo (JP); Naoki Tanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/719,948

(22) Filed: Sep. 29, 2017

(65) Prior Publication Data
US 2018/0025870 A1 Jan. 25, 2018

Related U.S. Application Data

(63) Continuation of application No. 14/346,795, filed as application No. PCT/JP2012/054202 on Feb. 22, 2012, now abandoned.

(30) Foreign Application Priority Data

Sep. 28, 2011 (JP) ................. 2011-211986

(51) Int. Cl.
*H01H 33/662* (2006.01)
*H02B 13/035* (2006.01)

(52) U.S. Cl.
CPC .... *H01H 33/66207* (2013.01); *H01H 33/662* (2013.01); *H02B 13/0354* (2013.01)

(58) Field of Classification Search
CPC ...... H01H 9/08; H01H 9/30; H01H 33/66207; H01H 33/662; H01H 33/6606; H01B 17/36; H01B 17/26; H02B 13/02; H02B 13/0354
(Continued)

(56) References Cited

U.S. PATENT DOCUMENTS

| 4,442,329 | A |   | 4/1984 | Gray et al. |
| 5,808,536 | A | * | 9/1998 | Sandlin, Jr. ............ H02G 15/06 336/107 |

(Continued)

FOREIGN PATENT DOCUMENTS

| JP | 59-62621 U | 4/1984 |
| JP | 63-198511 A | 8/1988 |

(Continued)

OTHER PUBLICATIONS

Translation JP5-135641 (original doc. published Jun. 1, 1993).*

(Continued)

*Primary Examiner* — Edwin A. Leon
*Assistant Examiner* — William A Bolton
(74) *Attorney, Agent, or Firm* — Buchanan Ingersoll & Rooney PC

(57) ABSTRACT

A vacuum circuit breaker includes a tank containing an electrical device. An opening corresponds to a terminal of the electrical device. A porcelain tube protruding from the tank is fixed to an opening base, and has a terminal conductor. A first connection conductor in the porcelain tube is connected to the terminal conductor. A second connection conductor is arranged in the porcelain tube. A third connection conductor is arranged between the first and the second connection conductor, has a closed end concave section fitted onto the first connection conductor and is connected to the second connection conductor by a fastener. A contact is (Continued)

disposed between said first connection conductor and the third connection conductor. The third and second connection conductors are made of a solid conductor. A center of the third connection conductor and a center of the second connection conductor are formed with a threaded section.

10 Claims, 6 Drawing Sheets

(58) Field of Classification Search
USPC ...... 218/134, 139, 97, 155, 154; 174/11 BH, 174/14 BH; 200/50.21
See application file for complete search history.

(56) References Cited

U.S. PATENT DOCUMENTS

| | | |
|---|---|---|
| 6,410,867 B1 | 6/2002 | Meyer |
| 6,630,638 B1 | 10/2003 | Freeman et al. |
| 2010/0288733 A1* | 11/2010 | Ichikawa ............. H01H 33/666 218/134 |
| 2012/0160810 A1 | 6/2012 | Ohtsuka et al. |
| 2012/0228266 A1* | 9/2012 | Nakada ................. H01H 33/42 218/120 |
| 2012/0228267 A1* | 9/2012 | Yoshida ............. H02B 13/0354 218/134 |
| 2013/0155640 A1* | 6/2013 | Sano ................. H02B 13/0356 361/816 |

FOREIGN PATENT DOCUMENTS

| | | |
|---|---|---|
| JP | 5-135641 A | 6/1993 |
| JP | 7-29436 A | 1/1995 |
| JP | 10-248126 A | 9/1998 |
| JP | 2011-97686 A | 5/2011 |
| WO | WO 2011/052010 A1 | 4/1984 |

OTHER PUBLICATIONS

Translation of JP, 07-029436 (Original document published Jan. 31, 1995) (Year: 1995).*
International Search Report (PCT/ISA/210) dated Mar. 19, 2012, by the Japanese Patent Office as the International Searching Authority for International Application No. PCT/JP2012/054202.
Chinese First Office Action dated Jun. 3, 2015 issued in the corresponding Chinese Patent Application No. 201280046607.2 (9 pages).
Machine translation of JP 5-135641 A attached to Office Action.

* cited by examiner

TANK TYPE VACUUM CIRCUIT BREAKER

TECHNICAL FIELD

The present invention relates to a tank type vacuum circuit breaker which can be preferably used as, for example, switchgear for electric power transmission/distribution and reception/distribution facilities.

BACKGROUND ART

As a conventional tank type vacuum circuit breaker, there is one which is disclosed in, for example, Japanese Unexamined Patent Publication No. 2011-97686; and its simple overview is shown in FIG. 5 and FIG. 6. FIG. 5 is a sectional view showing the conventional tank type vacuum circuit breaker; and FIG. 6 is a relevant part enlarged view showing the conventional tank type vacuum circuit breaker. In the respective drawings, identical or equivalent members and portions will be described with the same reference numerals and letters assigned thereto.

An electrically grounded pressure tank 2 that constitutes a tank type vacuum circuit breaker 1 is installed with a torso portion 2a being kept horizontal and a pair of cylindrical opening portions 2b, 2c are provided on the upper side of the pressure tank 2. Then, the pressure tank 2 includes: cylindrical current transformer mounting portions 2d, 2e, coaxial with the opening portions 2b, 2c and smaller in diameter than the opening portions 2b, 2c; and ring-shaped flange members F provided at connection portions between the opening portions 2b, 2c and the current transformer mounting portions 2d, 2e. Current transformers 7 which are for measuring current are installed on outer peripheral portions of the current transformer mounting portions 2d, 2e. Incidentally, in this example, the opening portions 2b, 2c and the current transformer mounting portions 2d, 2e are connected by welding via the flange members F.

A vacuum valve 4 serving as an electrical device is installed in the pressure tank 2 via a gap formed with respect to the torso portion 2a. The vacuum valve 4 is composed of a tubular vacuum vessel 41 made of insulation material such as ceramics; a fixed conductor 43 which is placed in the vacuum vessel 41, one end of the fixed conductor 43 being joined to an end plate 42 which is for airtight sealing a fixed side end section 41a of the vacuum vessel 41; and a movable conductor 45 which is disposed to be capable of being connected/disconnected to/from the fixed conductor 43, the other end of the movable conductor 45 being extended outside the vacuum vessel 41 via a bellows 44 attached to a movable side end section 41b of the vacuum vessel 41. A fixed contact 43a and a movable contact 45a are formed at a portion where the movable conductor 45 comes into contact with the fixed conductor 43, respectively. Incidentally, the end plate 42, the fixed conductor 43, and the movable conductor 45 are made of conductive material such as copper alloy and aluminum alloy; and the inside of the vacuum valve 4 is airtight held under vacuum.

Opening and closing means 3 by which the fixed contact 43a and the movable contact 45a are connected/disconnected is provided outside the pressure tank. The opening and closing means 3 is made to move the movable conductor 45 in a horizontal direction via an operation rod 5 and an insulation rod 6; and thus, the fixed contact 43a and the movable contact 45a are connected/disconnected to be closed/opened. At this time, the bellows 44 follows the movement of the movable conductor 45; and therefore, the inside of the vacuum valve 8 is held under vacuum.

A fixed side shield 51 and a movable side shield 52 are provided on both sides of the vacuum valve 4. The fixed side shield 51 is disposed so as to cover the fixed side end section 41a of the vacuum valve 4, and is connected to the end plate 42 on the fixed side. The movable side shield 52 is disposed so as to cover the movable side end section 41b of the vacuum valve 4 and an end section of the movable conductor 45, and is connected to a movable side end plate 46 of the vacuum valve 4. The fixed side shield 51 and the movable side shield 52 are made of conductive material such as aluminum alloy and copper alloy; and the surface thereof are each formed by a smooth surface with no edge.

Furthermore, the fixed side shield 51 is fastened to an insulation supporting rod 9 attached to a base plate 8 via an adapter 10; and all constituent components for one phase from the fixed side shield 51 to the operation rod 5 are supported by the insulation supporting rod 9. The insulation supporting rod 9 has strength and size which withstand the weight of the constituent components and a shock during opening and closing operation. Insertion portions 51a, 52a into which one ends of second connection conductors 22a, 32a disposed in center portions of intermediate bushings 210, 310 are inserted are provided at the tops of the fixed side shield 51 and the movable side shield 52. Incidentally, in this example, the insertion portions 51a, 52 have the function of terminal portions of the vacuum valve 4 serving as the electrical device. Furthermore, the opening portions 2b, 2c are provided corresponding to the insertion portions 51a, 52a serving as the terminal portions.

The fixed side shield 51 and the movable side shield 52 are formed so as to cover the fixed side end section 41a and the movable side end section 41b; and thus, electric field concentration at the fixed side end section 41a and the movable side end section 41b of the vacuum valve 4 can be reduced. Furthermore, the supporting configuration by the insulation supporting rod 9 is adopted; and thus, assembly to the base plate 8 and incorporation to the pressure tank 2 can be consolidated. A conductive coil 53 which is for electrically connecting both of the movable conductor 45 and the movable side shield 52 is provided therebetween. The conductive coil 53 made of copper alloy wiring material is formed into a coil spring shape with the whole formed to be circular.

The intermediate bushings 210, 310 in which lower end sections of the second connection conductors 22a, 32a are connected to the insertion portions 51a, 52a at the tops of the fixed side shield 51 and the movable side shield 52 pass through the opening portions 2b, 2c and the current transformer mounting portions 2d, 2e with a distance spaced apart therefrom and are disposed so as to go into lower portions of the porcelain tubes 20. Then, flange-shaped attaching portions 26, 36 integrally formed with insulators 21, 31 are formed in the vicinity of coupling portions of the porcelain tubes 20 and the current transformer mounting portions 2d, 2e on outer peripheral portions of intermediate bushings 210, 310; and the attaching portions 26, 36 are supported and fixed so as to be sandwiched at the coupling portions between the porcelain tubes 20 and the current transformer mounting portions 2d, 2e.

The intermediate bushings 210, 310 are composed of the hollow-shaped second connection conductor 22a, 32a; insulators 21, 31 which are shown marked with oblique lines in the drawing and are made of thermosetting resin such as epoxy resin coaxially cast-molded around the hollow-shaped second connection conductor 22a, 32a; and ground layers 23, 33 (to be described later) provided on axial central portions of the insulators 21, 31. Protrusion sections 22b, 22c, 32b, 32c whose outer diameters are formed to be large at portions just before being exposed from the insulators 21, 31 are provided in the vicinity of both ends of the second connection conductor 22a, 32a. Then, recess sections 24a, 24b, 34a, 34b formed so that the radial center sides of the insulators 21, 31 are smoothly axially concaved are provided around the periphery of triple junction portions composed of the insulators, the second connection conductors, and insulating gas.

Further, the ground layers 23, 33 made of, for example, conductive rubber or conductive coating material are provided at portions where the outer circumferential surfaces of the insulators 21, 31 are in proximity to grounded members such as the attaching portions of the porcelain tubes 20 and the current transformer mounting portions 2d, 2e, and are in proximity to the second connection conductor 22a, 32a. The ground layers 23, 33 are provided extending to the flange-shaped attaching portions 26, 36 centering on axial central portions of the intermediate bushings 210, 310.

Furthermore, end sections of the insulators 21, 31 on the lower side of the drawing located in the opening portions 2b, 2c of the pressure tank 2 are configured as large diameter portions A thicker in diameter than central portions passing through the current transformer mounting portions 2d, 2e. Similarly, end sections on the upper side of the drawing than the attaching portions of the porcelain tubes 20 are also formed with large diameter portions B thicker in diameter than portions passing through the attaching portions of the porcelain tubes 20 and the central portions.

Ground shields 25, 35 made of, for example, metal such as aluminum or brass, or conductive resin are provided between the large diameter portions A of the insulators 21, 31 and the ground layers 23, 33. The ground shields 25, 35 are placed only on the pressure tank 2 side in FIG. 5, but may be provided on the porcelain tube 20 side.

Furthermore, the large diameter portions A, B are formed at the axial both end sections of the insulators 21, 31, respectively; and thus, space electric fields of the creeping surfaces of the insulators and the circumferences of the insulators can be reduced. Effects by the attachment of the ground shields 25, 35 are similar. The end faces of the porcelain tube 20 on the sides opposite to the porcelain tube attaching portions (the upper end section side of the drawing) are airtight sealed by terminal conductors 12a, 12b. First connection conductors 11a, 11b whose other ends (the upper side of the drawing) are connected to the terminal conductors 12a, 12b are each formed in a hollow shape and are slidably connected with respect to upper end sections of the drawing of the second connection conductors 22a, 32a by contacts 13a, 13b provided at one ends thereof (the lower side). Through holes 14a to 14d through which the inside of the hollow conductors communicate with the outside thereof are provided in plural numbers in a circumferentially separated manner in the vicinity of end sections on the pressure tank 2 sides of the second connection conductors 22a, 32a and in the vicinity of the terminal conductors 12a, 12b of the first connection conductors 11a, 11b.

Furthermore, through holes 26a, 36a through which spaces of the current transformer mounting portions 2d, 2e partially communicate with inner spaces of the porcelain tubes 20a are provided at the flange-shaped attaching portions 26, 36 of the intermediate bushings 210, 310. Then, as insulating gas, dry air whose moisture content is less than or equal to 10 ppm is filled inside the pressure tank 2 and the porcelain tubes 20.

PRIOR ART DOCUMENT

Patent Document

Patent Document 1: Japanese Unexamined Patent Publication No. 2011-97686

SUMMARY OF THE INVENTION

Problems to be Solved by the Invention

In the aforementioned conventional tank type vacuum circuit breaker, the first connection conductors 11a, 11b whose other ends (the upper side of the drawing) are connected to the terminal conductors 12a, 12b are each formed in the hollow shape and are slidably connected with respect to the upper end sections of the drawing of the second connection conductors 22a, 32a by the contacts 13a, 13b provided at one ends thereof (the lower side). As described above, a problem exists in that when the contacts 13a, 13b provided on the first connection conductors 11a, 11b are inserted onto the second connection conductor 22a, 32a in order to connect the first connection conductors 11a, 11b to the second connection conductor 22a, 32a, metal powder generated due to abrasion between the contacts 13a, 13b and the second connection conductors 22a, 32a is attached to the insulators 31, 21 and accordingly insulation is likely to be deteriorated.

The present invention has been made to solve the above described problem, and an object of the present invention is to provide a tank type vacuum circuit breaker which can enhance insulation performance by a simple configuration.

Means for Solving the Problems

According to the present invention, there is provided a tank type vacuum circuit breaker including: a pressure tank which seals and contains an electrical device, and is formed with an opening portion corresponding to a terminal portion provided on the electrical device; a porcelain tube which is disposed so as to protrude with respect to the pressure tank, is fixed to the opening portion at a base portion thereof, and is provided with a terminal conductor at a leading end portion thereof; a first connection conductor which is led out into a center portion of the porcelain tube at one end thereof, and is connected to the terminal conductor at the other end thereof; a second connection conductor which has a concave section to be fitted onto the first connection conductor at one side thereof, and is connected to the terminal portion at the other side thereof; and a contact disposed between the first connection conductor and the concave section of the second connection conductor.

Furthermore, according to the present invention, there is provided a tank type vacuum circuit breaker including: a pressure tank which seals and contains an electrical device, and is formed with an opening portion corresponding to a terminal portion provided on the electrical device; a porcelain tube which is disposed so as to protrude with respect to the pressure tank, is fixed to the opening portion at a base portion thereof, and is provided with a terminal conductor at a leading end portion thereof; a first connection conductor which is led out into a center portion of the porcelain tube at one end thereof, and is connected to the terminal conductor at the other end thereof; a second connection conductor which is opposite to one end of the first connection conductor at one side thereof, and is arranged so as to be interposed between one side thereof and the terminal portion at the other side thereof; a third connection conductor which is serially arranged between the first connection conductor and the second connection conductor, has a concave section to be fitted onto the first connection conductor at one side thereof, and is connected to one side of the second connection conductor at the other side thereof by a fastener; and a contact disposed between the first connection conductor and the concave section of the third connection conductor.

Advantageous Effect of the Invention

According to the tank type vacuum circuit breaker according to the present invention, there can be obtained the tank type vacuum circuit breaker which can enhance insulation performance by a simple configuration.

MODE FOR CARRYING OUT THE INVENTION

Embodiment 1

Figure 1:
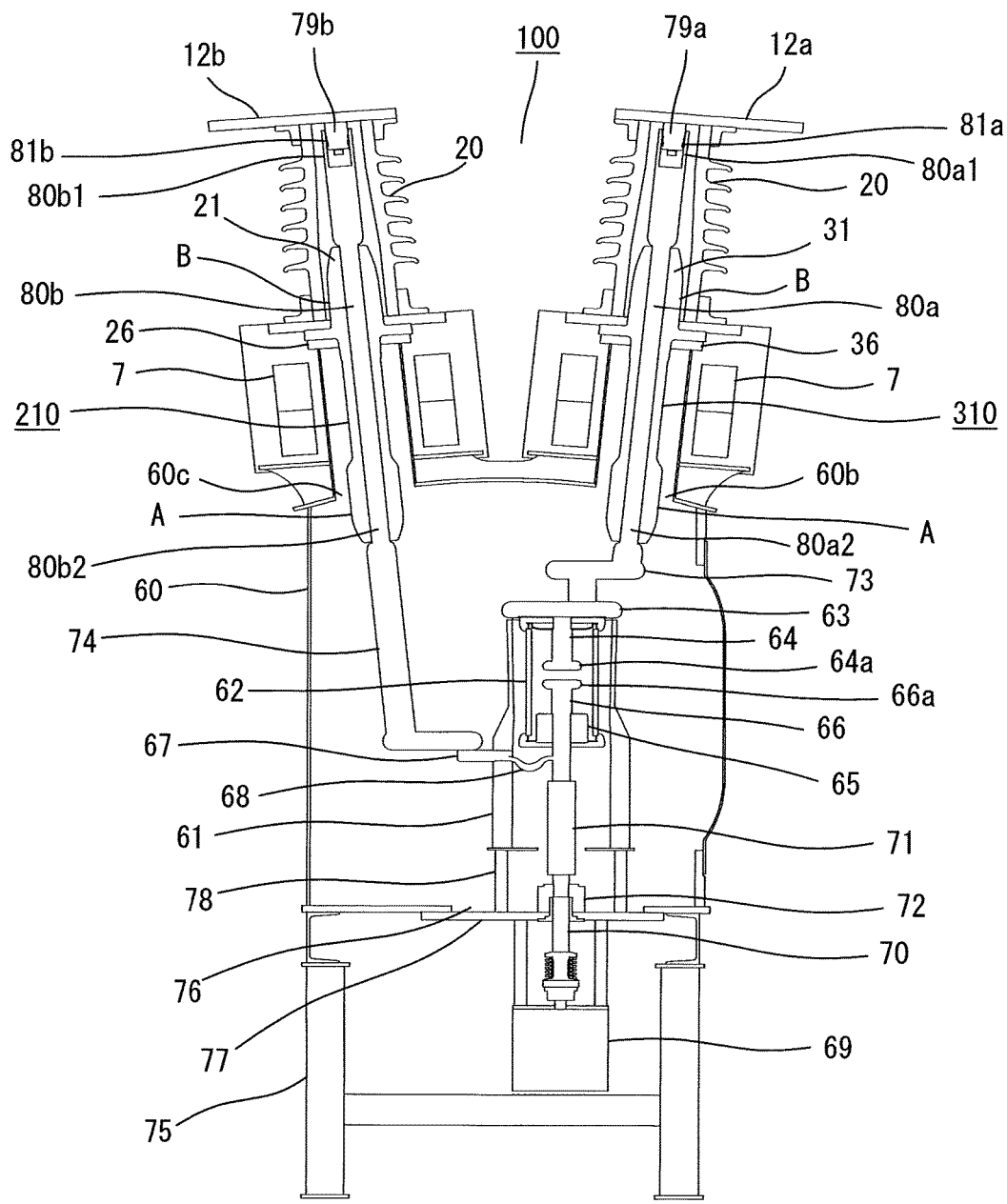
FIG. 1 is a sectional view showing a tank type vacuum circuit breaker according to Embodiment 1 of the present invention.
Figure 2:
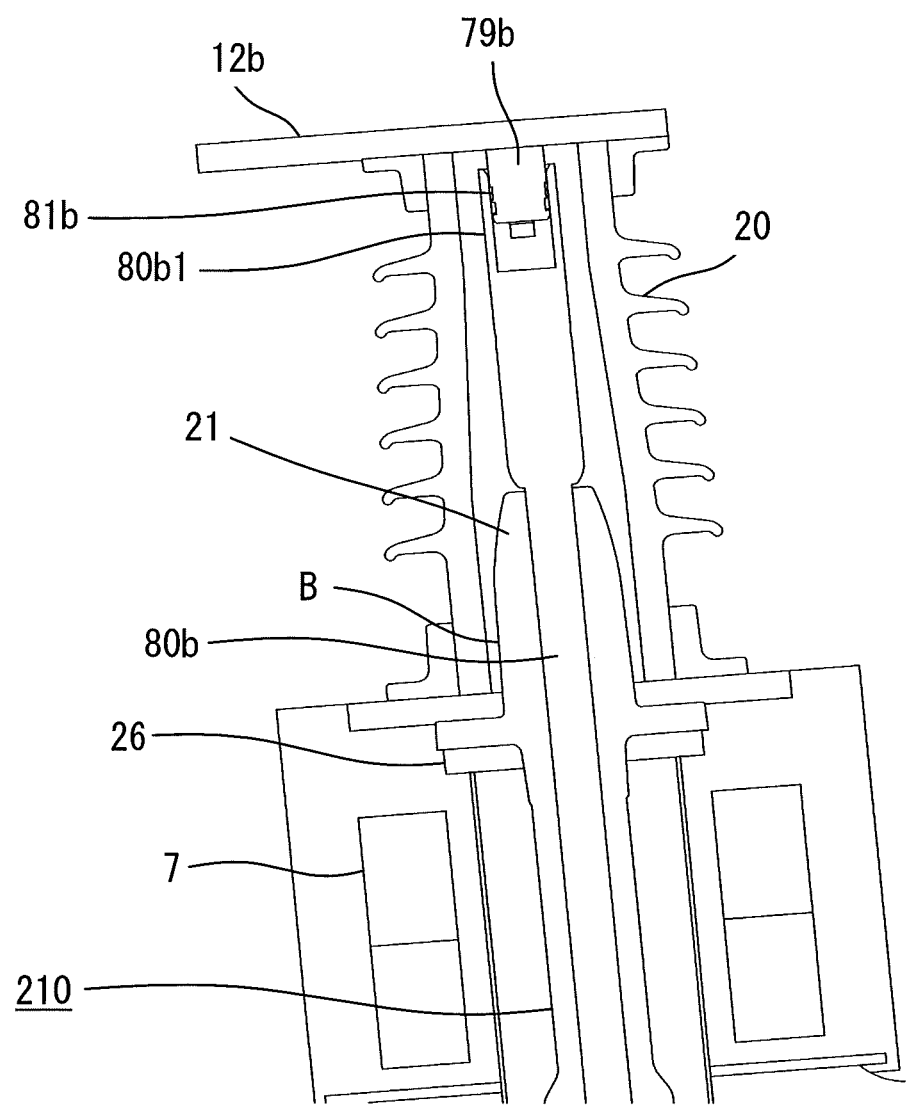
FIG. 2 is a relevant part enlarged view showing the tank type vacuum circuit breaker according to Embodiment 1 of the present invention.

Hereinafter, Embodiment 1 of the present invention will be described with reference to FIG. 1 and FIG. 2. Then, in the respective drawings, identical or equivalent members and portions will be described with the same reference numerals and letters assigned thereto. FIG. 1 is a sectional view showing a tank type vacuum circuit breaker according to Embodiment 1 of the present invention. FIG. 2 is a relevant part enlarged view showing the tank type vacuum circuit breaker according to Embodiment 1 of the present invention.

A vacuum valve 62 supported in an insulating frame 61 is installed in an electrically grounded pressure tank 60 that constitutes a tank type vacuum circuit breaker 100, the vacuum valve 62 being served as an electrical device. The vacuum valve 62 is constituted of a tubular body made of insulation material such as ceramics. The vacuum valve 62 includes: a fixed side current-carrying shaft 64 at one end, the fixed side current-carrying shaft 64 being joined to a fixed side terminal 63 for airtight sealing a fixed side end section; and a movable side current-carrying shaft 66 at the other end, the movable side current-carrying shaft 66 being disposed to be capable of connecting/disconnecting to/from the fixed side current-carrying shaft 64 and being extended outside the vacuum valve 62 via a bellows 65 attached to a movable side end section. A fixed side electrode 64a and a movable side electrode 66a are formed at a portion at which the movable side current-carrying shaft 6 comes into contact with the fixed side current-carrying shaft 64, respectively.

Furthermore, a movable side terminal 67 is connected to the movable side current-carrying shaft 66 via a flexible conductor 68. Then, an internal conductor 73 is connected to the fixed side terminal 63 and an internal conductor 74 is connected to the movable side terminal 67.

Opening and closing means 69 by which the movable side electrode 66a is connected and/or disconnected to/from the fixed side electrode 64a is provided outside the pressure tank 60. The opening and closing means 69 moves the movable side current-carrying shaft 66, for example, in a vertical direction via an operation rod 70 and an insulation rod 71; and thus, the movable side electrode 66a is connected/disconnected to be closed/opened to/from the fixed side electrode 64a. At this time, a bellows 72 follows the movement of the movable side current-carrying shaft 66 and therefore the inside of the vacuum valve 62 is held under vacuum.

The pressure tank 60 is formed with opening portions 60b, 60c corresponding to terminal portions provided on the vacuum valve 62. Porcelain tubes 20 are disposed so as to protrude with respect to the pressure tank 60; and terminal conductors 12a, 12b are provided at leading end portions.

The pressure tank 60 is mounted on a pedestal 75. An opening portion 76 for installing devices such as the vacuum valve 62 is formed at the bottom of the pressure tank 60; and a flange 77 which blocks the opening portion 76 is disposed. A brace member 78 which supports the insulating frame 61 is arranged on the flange 77.

One ends of first connection conductors 79a, 79b are led out into center portions of the porcelain tubes 20 and the other ends are connected to the terminal conductors 12a, 12b. One sides of second connection conductors 80a, 80b are formed with concave sections 80a1, 80b1 to be fitted onto one ends of the first connection conductors 79a, 79b. The other side 80a2 of the second connection conductor 80a is connected to the internal conductor 73 to be connected to the fixed side terminal 63, and is electrically connected to the fixed side current-carrying shaft 64 of the vacuum valve 62. Similarly, the other side 80b2 of the second connection conductor 80b is connected to the internal conductor 74 to be connected to the movable side terminal 67, and is electrically connected to the movable side current-carrying shaft 66 of the vacuum valve 62.

Incidentally, insulators 31, 21 are provided so as to coaxially surround around axial central portions of the second connection conductors 80a, 80b.

Contacts 81a, 81b are disposed to be electrically connected between the first connection conductors 79a, 79b and the concave sections 80a1, 80b1 of the second connection conductors 80a, 80b. The drawing shows, as an example, that the grooves are formed on the first connection conductor 79a, 79b sides and the contacts 81a, 81b are attached to the grooves. Incidentally, grooves may be formed on the concave section 80a1, 80b1 sides of the second connection conductors 80a, 80b and the contacts 81a, 81b may be attached to the grooves.

The connection states of the first connection conductors 79a, 79b and the second connection conductors 80a, 80b in the thus configured tank type vacuum circuit breaker will be described.

As for the connection of the first connection conductors 79a, 79b and the second connection conductors 80a, 80b, the contacts 81a, 81b attached to the grooves formed on the first connection conductors 79a, 79b are fitted into the concave sections 80a1, 80b1 formed on one sides of the second connection conductors 80a, 80b; and thus, the first connection conductors 79a, 79b are electrically connected to the second connection conductors 80a, 80b.

Such a configuration is made; and therefore, even when metal powder is generated due to abrasion between the contacts 81a, 81b and the second connection conductors 80a, 80b when the first connection conductors 79a, 79b are inserted into the concave sections 80a1, 80b1 of the second connection conductors 80a, 80b, the concave sections 80a1, 80b1 serve as metal powder receivers, the metal powder is not attached to the insulators 31, 21, insulation performance can be enhanced, and insulation deterioration can be prevented.

Furthermore, gaps are provided between the first connection conductors 79a, 79b and the bottom surfaces of the concave sections 80a1, 80b1 of the second connection conductor 80a, 80b; and therefore, errors in assembling of the first connection conductors 79a, 79b, the second connection conductors 80a, 80b, and the terminal conductor 12a, 12b are absorbed by the gap and an improvement in assembling performance can also be achieved.

Embodiment 2

Figure 3:
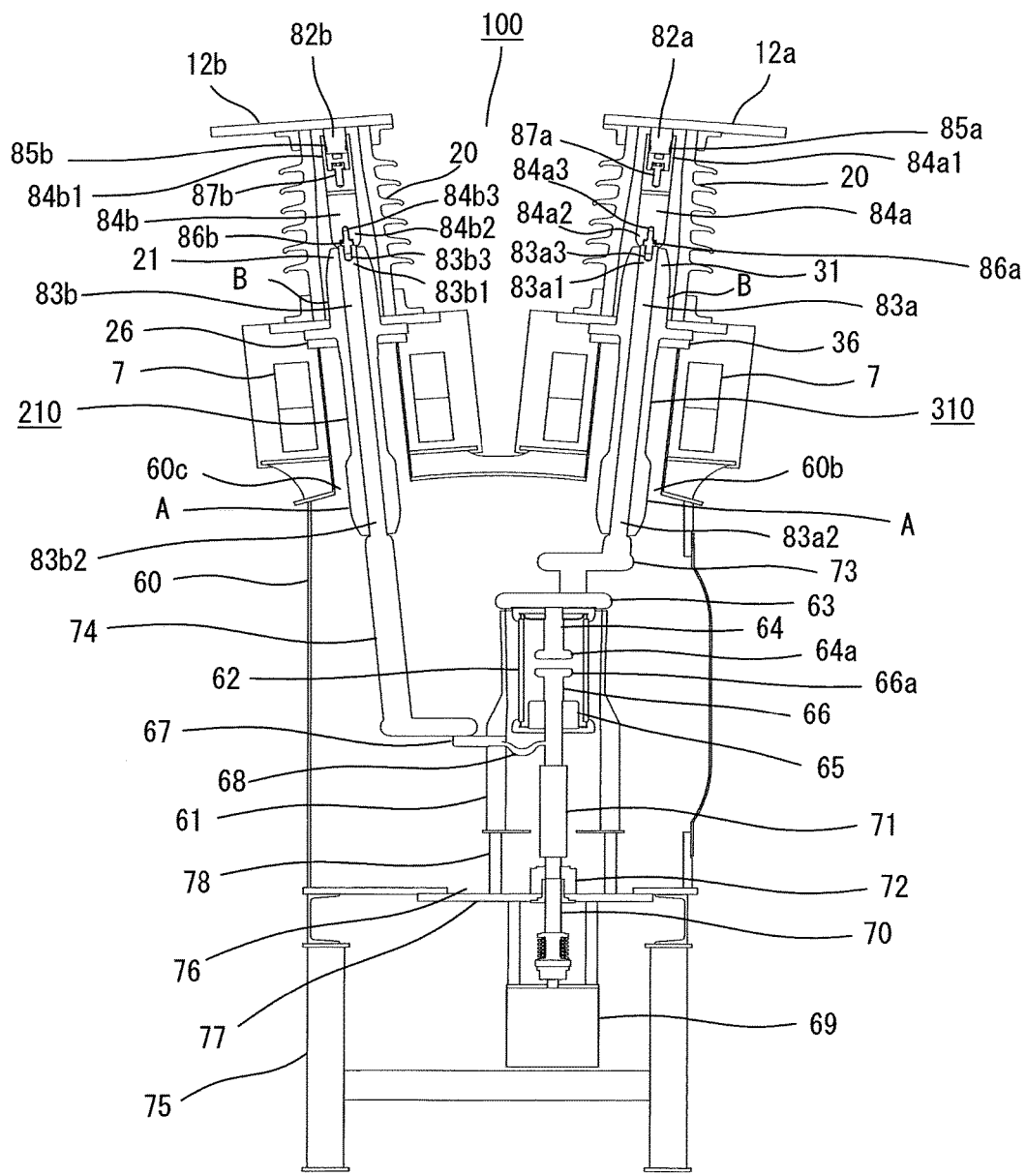
FIG. 3 is a sectional view showing a tank type vacuum circuit breaker according to Embodiment 2 of the present invention.
Figure 4:
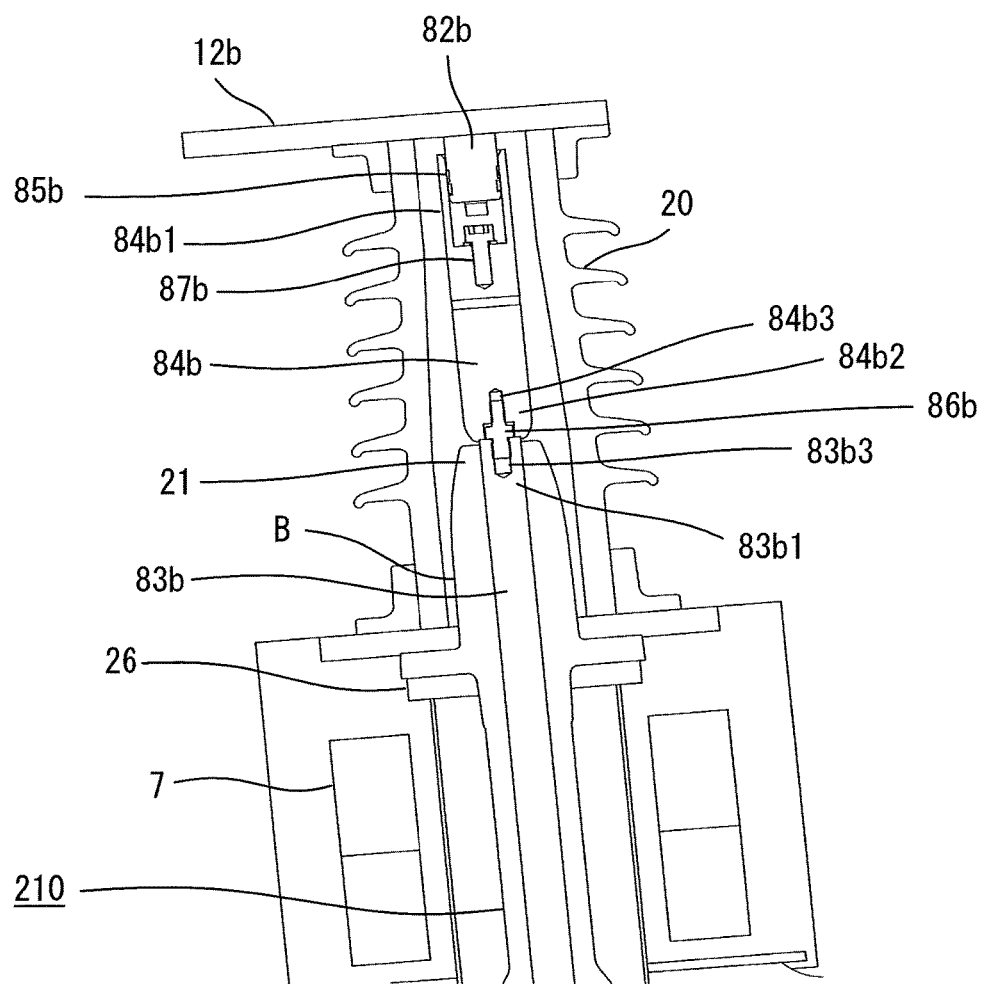
FIG. 4 is a relevant part enlarged view showing the tank type vacuum circuit breaker according to Embodiment 2 of the present invention.
Figure 5:
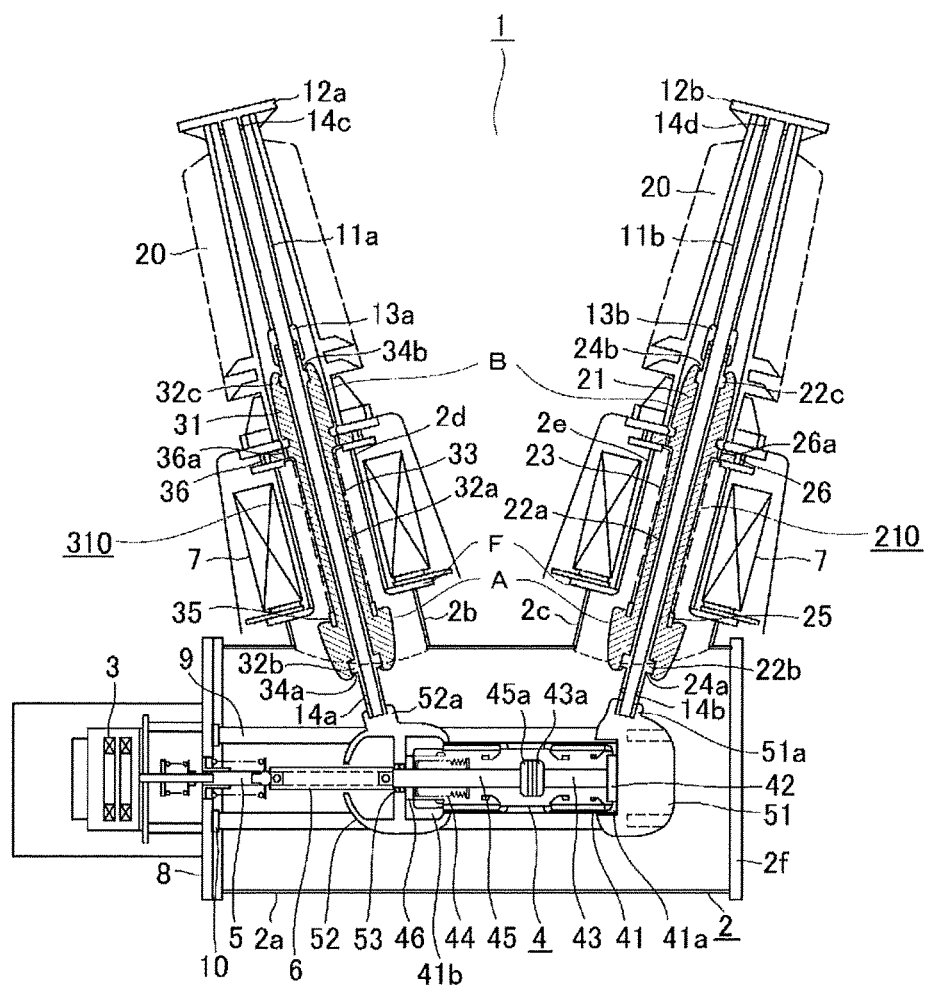
FIG. 5 is a sectional view showing a conventional tank type vacuum circuit breaker.
Figure 6:
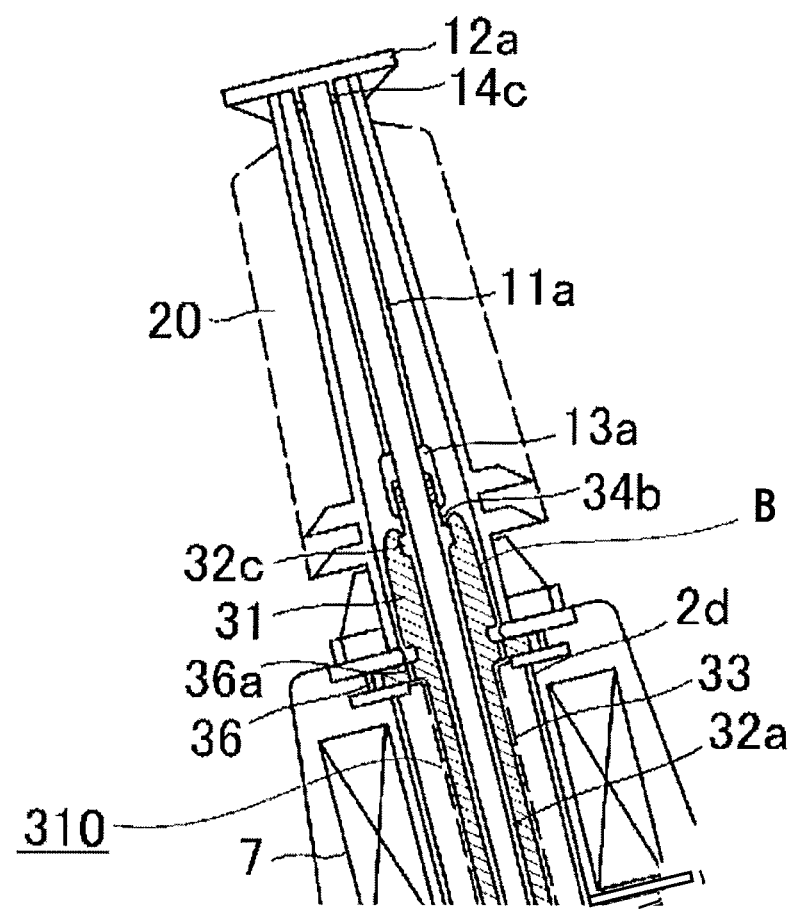
FIG. 6 is a relevant part enlarged view showing the conventional tank type vacuum circuit breaker.

Embodiment 2 of the present invention will be described with reference to FIG. 3 and FIG. 4. Then, in the respective drawings, identical or equivalent members and portions will be described with the same reference numerals and letters assigned thereto. FIG. 3 is a sectional view showing a tank type vacuum circuit breaker according to Embodiment 2 of the present invention. FIG. 4 is a relevant part enlarged view showing the tank type vacuum circuit breaker according to Embodiment 2 of the present invention.

In this Embodiment 2, the configuration of connection conductors between terminal conductors 12a, 12b and internal conductors 73, 74 are different; but, other configuration is similar to the configuration of Embodiment 1 and their description will be omitted.

One ends of first connection conductors 82a, 82b are led out into center portions of porcelain tubes 20; and the other ends thereof are connected to terminal conductors 12a, 12b. One sides 83a1, 83b1 of second connection conductors 83a, 83b are opposite to one ends of the first connection conductors 82a, 82b; and the other sides 83a2, 83b2 are arranged so as to be interposed between one sides 83a1, 83b1 and terminal portions of a vacuum valve 62. More specifically, the other side 83a2 of the second connection conductor 83a is connected to the internal conductor 73 to be connected to a fixed side terminal 63 and is electrically connected to a fixed side current-carrying shaft 64 of the vacuum valve 62. Similarly, the other side 83b2 of the second connection conductor 83b is connected to the internal conductor 74 to be connected to a movable side terminal 67 and is electrically connected to a movable side current-carrying shaft 66 of the vacuum valve 62.

Incidentally, insulators 31, 21 are provided so as to coaxially surround around the second connection conductors 83a, 83b.

Contacts 85a, 85b are disposed to be electrically connected between the first connection conductors 82a, 82b and concave sections 84a1, 84b1 of third connection conductors 84a, 84b. The drawing shows, as an example, that grooves are formed on the first connection conductor 82a, 82b sides and the contacts 85a, 85b are attached to the grooves. Incidentally, grooves may be formed on the concave section 84a1, 84b1 sides of the third connection conductors 84a, 84b and the contacts 85a, 85b may be attached to the grooves.

The third connection conductors 84a, 84b are serially arranged between the first connection conductors 82a, 82b and the second connection conductors 83a, 83b; the concave sections 84a1, 84b1 to be fitted onto the first connection conductors 82a, 82b are provided at one side of the third connection conductors 84a, 84b; and the other sides 84a2, 84b2 are connected to one side 83a1, 83b1 of the second connection conductors 83a, 83b by fasteners 86a, 86b.

The connection states of the first connection conductors 82a, 82b, the second connection conductors 83a, 83b, and the third connection conductors 84a, 84b in the thus configured tank type vacuum circuit breaker will be described.

First, as for the connection of the first connection conductors 82a, 82b and the third connection conductor 84a, 84b, the contacts 85a, 85b attached to the grooves formed on the first connection conductors 82a, 82b are fitted into the concave sections 84a1, 84b1 formed on one sides of the third connection conductors 84a, 84b; and thus, the first connection conductors 82a, 82b are electrically connected to the third connection conductors 84a, 84b.

Such a configuration is made; and therefore, even when metal powder is generated due to abrasion between the contact 85a, 85b and the third connection conductors 84a, 84b when the first connection conductors 82a, 82b are inserted into the concave sections 84a1, 84b1 of the third connection conductors 84a, 84b, the concave sections 84a1, 84b1 serve as metal powder receivers, the metal powder is not attached to the insulators 31, 21, insulation performance can be enhanced, and insulation deterioration can be prevented.

Then, the connection of the third connection conductors 84a, 84b and the second connection conductors 83a, 83b is made in the following manner. The drawing shows, as an example, that the third connection conductors 84a, 84b and the second connection conductors 83a, 83b are each made of a solid conductor; center portions of the other sides 84a2, 84b2 of the third connection conductors 84a, 84b and center portions of one sides 83a1, 83b1 of the second connection conductors 83a, 83b are formed with threaded sections 83a3, 83b3, 84a3, 84b3, respectively; the fasteners 86a, 86b each made of a double-end stud are screwed to the respective threaded sections 83a3, 83b3, 84a3, 84b3; and thus, the third connection conductors 84a, 84b are electrically connected to the second connection conductors 83a, 83b.

In this manner, the connection of the third connection conductors 84a, 84b and the second connection conductors 83a, 83b is made by using the fasteners 86a, 86b each made of the double-end stud; and therefore, a reduction in clamping torque can be achieved and assembly work becomes easy. Incidentally, in order to easily obtain fastening torque of the third connection conductors 84a, 84b and the second connection conductors 83a, 83b, the drawing shows, as an example, that bolts for applying fastening torque 87a, 87b are clamped to the concave sections 84a1, 84b1 of the third connection conductors 84a, 84b.

INDUSTRIAL APPLICABILITY

The present invention is suitable for achieving a tank type vacuum circuit breaker which can enhance insulation performance by a simple configuration.

What is claimed is:
1. A tank type vacuum circuit breaker comprising:
a pressure tank which seals and contains an electrical device, and is formed with an opening portion corresponding to a terminal portion provided on said electrical device;

a porcelain tube which is disposed so as to protrude with respect to said pressure tank, is fixed to the opening portion at a base portion thereof, and is provided with a terminal conductor at a leading end portion thereof;

a first connection conductor which is led out into a center portion of said porcelain tube at one end thereof, and is connected to said terminal conductor at the other end thereof;

a second connection conductor which is opposite to one end of said first connection conductor at one side thereof, and is arranged so as to be interposed between one side thereof and the terminal portion at the other side thereof;

a third connection conductor which is serially arranged between said first connection conductor and said second connection conductor, has a closed end concave section to be fitted onto said first connection conductor via contacts at one side thereof, wherein grooves are formed on either the first connection conductor or the third connection conductor and the contacts are attached to the grooves, wherein a gap is provided between the first connection conductor and a bottom surface of the concave section, the third connection conductor being connected to one side of said second connection conductor at the other side thereof by a fastener; and wherein said third connection conductor and said second connection conductor are each made of a solid conductor, and a center portion of the other side of said third connection conductor and a center portion of one side of said second connection conductor are each formed with a threaded section.

2. The tank type vacuum circuit breaker according to claim 1,
wherein said first connection conductor is fitted into the concave section formed on one side of said third connection conductor, and said first connection conductor is electrically connected to said third connection conductor by said contacts disposed between said first connection conductor and the concave section of said third connection conductor.

3. The tank type vacuum circuit breaker according to claim 1,
wherein the fastener is constituted of a double-end stud screwed to each of the threaded sections, whereby said third connection conductor is electrically connected to said second connection conductor.

4. The tank type vacuum circuit breaker according to claim 1,
further including an insulator that surrounds the second connection conductor.

5. The tank type vacuum circuit breaker according to claim 4,
wherein the contacts between the first connection conductor and the concave section of the third connection conductor is disposed above the insulator.

6. The tank type vacuum circuit breaker according to claim 4,
wherein the insulator extends short of the first connection conductor so that the first connection conductor is not surrounded by insulation.

7. The tank type vacuum circuit breaker according to claim 1,
wherein the second connection conductor has a length that is greater than a length of the first connection conductor.

8. The tank type vacuum circuit breaker according to claim 1,
wherein the second connection conductor has a length that is greater than a length of the third connection conductor.

9. The tank type vacuum circuit breaker according to claim 1,
wherein the second connection conductor abuts against the third connection conductor.

10. A tank type vacuum circuit breaker comprising:
a pressure tank which seals and contains an electrical device, and is formed with an opening portion corresponding to a terminal portion provided on said electrical device;

a porcelain tube which is disposed so as to protrude with respect to said pressure tank, is fixed to the opening portion at a base portion thereof, and is provided with a terminal conductor at a leading end portion thereof;

a first connection conductor which is led out into a center portion of said porcelain tube at one end thereof, and is connected to said terminal conductor at the other end thereof;

a second connection conductor which is opposite to one end of said first connection conductor at one side thereof, and is arranged so as to be interposed between one side thereof and the terminal portion at the other side thereof;

a third connection conductor which is serially arranged between said first connection conductor and said second connection conductor, has a closed end concave section to be fitted onto said first connection conductor at one side thereof, and is connected to one side of said second connection conductor at the other side thereof by a fastener; and a contact disposed between said first connection conductor and the concave section of said third connection conductor;

wherein said third connection conductor and said second connection conductor are each made of a solid conductor, and a center portion of the other side of said third connection conductor and a center portion of one side of said second connection conductor are each formed with a threaded section, wherein the fastener is constituted of a double-end stud screwed to each of the threaded sections, whereby said third connection conductor is electrically connected to said second connection conductor.

* * * * *